(12) United States Patent
Zhou

(10) Patent No.: US 11,178,077 B2
(45) Date of Patent: Nov. 16, 2021

(54) REAL-TIME DATA PROCESSING AND STORAGE APPARATUS

(71) Applicant: HUAWEI TECHNOLOGIES CO., LTD., Guangdong (CN)

(72) Inventor: Bo Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1 day.

(21) Appl. No.: 16/713,882

(22) Filed: Dec. 13, 2019

(65) Prior Publication Data

US 2020/0120045 A1    Apr. 16, 2020

Related U.S. Application Data

(63) Continuation of application No. PCT/CN2018/091340, filed on Jun. 14, 2018.

(30) Foreign Application Priority Data

Jun. 15, 2017   (CN) .......................... 201710454253.X

(51) Int. Cl.
   *H04L 12/861*      (2013.01)
   *H04L 12/801*      (2013.01)
   *H04L 12/863*      (2013.01)

(52) U.S. Cl.
   CPC .............. *H04L 49/90* (2013.01); *H04L 47/34* (2013.01); *H04L 47/6225* (2013.01)

(58) Field of Classification Search
   CPC ........ G06F 9/5033; G06F 5/06; G06F 9/3867; G06F 9/3824; H04L 47/34;
   (Continued)

(56) References Cited

U.S. PATENT DOCUMENTS 6,026,461 A * 2/2000 Baxter .................... G06F 11/22
                                                      710/120
6,055,619 A * 4/2000 North ...................... G10H 7/002
                                                      704/270

(Continued)

FOREIGN PATENT DOCUMENTS

CN         1588985 A       3/2005
CN       101039323 A       9/2007
(Continued)

*Primary Examiner* — Man U Phan
(74) *Attorney, Agent, or Firm* — Womble Bond Dickinson (US) LLP

(57) ABSTRACT

A stream processor is disclosed, the stream processor includes: a first in first out memory FIFO, a calculation unit, and a cache. The FIFO receives current stream information, where the current stream information carries a target stream number and target data; when the FIFO receives a read valid signal, the FIFO sends the target stream number and the target data to the calculation unit, and sends the target stream number to the cache; the cache obtains, based on the target stream number, old data that corresponds to the target stream number, and sends the old data that corresponds to the target stream number to the calculation unit; and the calculation unit performs, based on the target data, calculation on the old data that corresponds to the target stream number to obtain new data, and sends the new data to the cache.

20 Claims, 7 Drawing Sheets

(58) Field of Classification Search
CPC ............. H04L 47/6225; H04L 49/9057; H04L 49/3018; H04L 49/90; H04L 12/861; H04L 12/863; H04L 12/801
USPC ........................................................ 370/412
See application file for complete search history.

(56) References Cited

U.S. PATENT DOCUMENTS

| | | | | |
|---|---|---|---|---|
| 6,415,377 | B1* | 7/2002 | Van Der Wolf | G06F 9/3455 |
| | | | | 712/207 |
| 7,188,250 | B1* | 3/2007 | Alfieri | H04L 9/06 |
| | | | | 713/161 |
| 7,397,797 | B2* | 7/2008 | Alfieri | H04L 29/06 |
| | | | | 370/392 |
| 7,398,356 | B2* | 7/2008 | Tran | G06F 12/0848 |
| | | | | 711/119 |
| 7,424,571 | B2* | 9/2008 | Sikdar | H04L 45/742 |
| | | | | 710/52 |
| 7,451,268 | B2* | 11/2008 | Sikdar | G06F 12/0864 |
| | | | | 710/52 |
| 8,094,670 | B1* | 1/2012 | Alfieri | H04L 45/00 |
| | | | | 370/429 |
| 8,255,644 | B2* | 8/2012 | Sonnier | H04L 49/109 |
| | | | | 711/154 |
| 8,521,955 | B2* | 8/2013 | Arulambalam | G06F 3/064 |
| | | | | 711/114 |
| 8,886,878 | B1 | 11/2014 | Neudorf et al. | |
| 10,209,904 | B2* | 2/2019 | Himelstein | G06F 11/0709 |
| 2001/0047456 | A1 | 11/2001 | Schrobenhauzer et al. | |
| 2006/0080479 | A1 | 4/2006 | Anjo et al. | |
| 2008/0148028 | A1 | 6/2008 | Grandou et al. | |
| 2009/0144527 | A1 | 6/2009 | Nakata et al. | |
| 2014/0201458 | A1 | 7/2014 | Fujikami et al. | |
| 2016/0227002 | A1 | 8/2016 | Lin et al. | |
| 2020/0059429 | A1 | 2/2020 | Huang | |

FOREIGN PATENT DOCUMENTS

| | | |
|---|---|---|
| CN | 101446890 A | 6/2009 |
| CN | 104469845 A | 3/2015 |
| CN | 104580025 A | 4/2015 |
| CN | 107273100 A | 10/2017 |

* cited by examiner

REAL-TIME DATA PROCESSING AND STORAGE APPARATUS

CROSS-REFERENCE TO RELATED APPLICATIONS

This application is a continuation of International Application No. PCT/CN2018/091340, filed on Jun. 14, 2018, which claims priority to Chinese Patent Application No. 201710454253.X, filed on Jun. 15, 2017. The disclosures of the aforementioned applications are hereby incorporated by reference in their entireties.

TECHNICAL FIELD

This application relates to the fields of data processing and data storage, and in particular, to a real-time data processing and storage apparatus.

BACKGROUND

In recent years, with the rapid development of new services such as a big data service, a virtual reality (VR) service, an augmented reality (AR) service, a self-driving service, a mobile internet service, and an internet of things (IoT) service, an internet protocol (IP) interface between a network such as a 100GE or 400 GE (gigabit Ethernet) network and another network gradually develops into an ultra-high-bandwidth (UHB) Ethernet interface represented by the 100GE or 400 GE. During rapid evolution of UHB technologies, processing of massive data streams by stream processors requires increasingly high real-time performance. In addition, in such a high-speed process, data storage requires increasingly high timeliness and reliability.

In an existing data stream processing technology, data stream processing by a stream processor includes accessing an external memory and performing read-modify-write operations on data stored in the stream processor (that is, first, the stream processor reads data from the external memory, next, the stream processor modifies the data, and finally, the stream processor writes the modified data into the external memory for storage). A stream processing cycle of the stream processor is essentially a read-modify-write latency period during which the stream processor accesses the external memory (that is, a sum of a data read period, a data modify period, and a data write period of the stream processor).

In the foregoing existing data stream processing technology, the stream processing cycle of the stream processor is a total period of a process of performing read-modify-write operations on the external memory. For a hard real-time operation or service that requires that a latency period of a stream processor be less than the foregoing read-modify-write latency period, such type of processor has a long stream processing cycle and cannot meet a data stream processing requirement of such type of hard real-time operation or service.

SUMMARY

Embodiments of this application provide a stream processor, to shorten a stream processing cycle of the stream processor and improve a capability of the stream processor to process a hard real-time service.

According to a first aspect, the embodiments of this application provide a stream processor, including: a first in first out memory (FIFO), a calculation unit, and a cache. First, the FIFO receives current stream information, where the current stream information carries a target stream number and target data; next, when the FIFO receives a read valid signal, the FIFO sends the target stream number and the target data to the calculation unit, and sends the target stream number to the cache; subsequently, the cache obtains, based on the target stream number received by the cache, old data that corresponds to the target stream number, and sends the old data to the calculation unit; and finally, after the calculation unit learns of the old data that corresponds to the target stream number and the target data, the calculation unit performs, based on the target data, calculation on the old data that corresponds to the target stream number to obtain new data, and the calculation unit sends the new data to the cache for caching. In this way, the stream processor completes a stream processing operation on the current stream information.

As can be learned from the foregoing technical solution, the embodiments of this application have the following advantages: The stream processor includes the FIFO and the cache. On one hand, the FIFO has a first in first out feature, and can store a particular amount of stream information, so that when the stream processor obtains the old data that corresponds to the target stream number, other stream information can still enter the FIFO for storage, and each piece of stream information does not need to wait in a queue, thereby shortening the stream processing cycle. On the other hand, the cache can cache the old data and therefore can directly provide old data support for the calculation unit in a particular case, to accelerate stream processing; in addition, the cache can cache the new data and therefore may not necessarily write the new data into an external memory in a stream processing process, and it may be understood that a caching speed is much higher than a data write speed of the external memory, so that the stream processing cycle of the stream processor is shortened to some extent. Based on the foregoing two aspects, for the stream processor in this application, the stream processing cycle of the stream processor may be approximately reduced from a data read-modify-write latency period to a data modify latency period (that is, a period required by the calculation unit to obtain the new data by performing calculation on the old data). Therefore, in this application, the stream processing cycle of the stream processor can be effectively shortened, and a stream processing speed can be improved, to improve a capability of the stream processor to process a hard real-time service, so that the stream processor can process a service having a higher real-time requirement.

In a hard real-time processing scenario in which read and write of massive traffic are balanced, according to the technical solution of this application, technical effects that no miss occurs in data processing and data storage, and a packet loss rate is approximately zero (that is, a packet is never lost) can be achieved.

In one embodiment of the first aspect, the cache includes an address processing module, and the address processing module is configured to: store a packet stream number received by the cache for only a preset period, and delete a packet stream number that has been stored for a period exceeding the preset period, where a packet stream number is sequentially mapped to a corresponding offset address in the external memory based on a value of the packet stream number, and currently, the packet stream number includes the target stream number.

In one embodiment of the first aspect, the cache includes an address in the external memory to which a packet stream number in the address processing module is directly mapped. In this way, once a packet stream number is received, an address at which data corresponding to the packet stream number is stored in the external memory can be quickly determined, which is convenient and efficient.

In one embodiment of the first aspect, the cache further includes a time processing module, and the time processing module is configured to manage the preset period. Each packet stream number corresponds to one preset period, and preset periods may be equal or not equal.

In one embodiment of the first aspect, the time processing module is provided to manage the preset period. In this way, packet stream numbers may correspond to varied preset periods, so that each packet stream number may correspond to a different preset period, and a preset period may be further appropriately adjusted based on different stream information.

In one embodiment of the first aspect, the cache further includes a data processing module, and the data processing module is configured to store and manage old data that corresponds to the packet stream number, and has a mapping relationship with the foregoing address processing module. The old data that corresponds to the packet stream number is data obtained after the calculation unit performs calculation on a previous piece of stream information with the same packet stream number.

In one embodiment of the first aspect, the data processing module is used to store and manage the old data, to facilitate a data read operation and reduce a memory addressing time.

In one embodiment of the first aspect, the cache further includes a selector, and the selector is configured to select the old data that is cached in the cache and that corresponds to the packet stream number to the calculation unit and send the old data, or select old data that is in a storage controller and that corresponds to the packet stream number to the calculation unit and send the old data. It may be understood that the old data in the storage controller is read by the storage controller from the external memory.

In one embodiment of the first aspect, according to different actual application scenarios, a selection function of the selector can prevent erroneous old data from being input to perform calculation, thereby increasing a rate of detecting incorrect detection.

In one embodiment of the first aspect, the cache is further configured to: when the same packet stream number is received twice by the cache at a time interval less than or equal to the preset period, send the old data cached in the cache to the calculation unit; or when different packet stream numbers are received or the same packet stream number is received twice by the cache at a time interval greater than the preset period, send, to the calculation unit, the old data sent by the storage controller to the cache.

In one embodiment of the first aspect, the cache can effectively avoid a race hazard of the same packet stream number.

In one embodiment of the first aspect, the calculation unit is configured to perform, according to a pipeline bypassing mechanism and by using the target data, calculation on the old data that corresponds to the target stream number to obtain the new data. The calculation may include calculation that corresponds to a hard real-time operation, or may be calculation that corresponds to a soft real-time operation. This is not limited in this embodiment of this application.

In one embodiment of the first aspect, a speed of processing the stream information can be effectively increased by using the pipeline bypassing mechanism.

In one embodiment of the first aspect, the FIFO further includes a parsing module, where when the FIFO receives the current stream information, the parsing module parses the current stream information, and obtains a packet stream number (which is used as the target stream number) and the target data that are carried in the current stream information after the parsing.

In one embodiment of the first aspect, the FIFO distributes the target stream number and the target data, and uses the parsing module to parse the current stream information to obtain the corresponding target stream number and target data.

In one embodiment of the first aspect, the stream processor further includes the storage controller, where the storage controller is configured to write the new data to a target address in the external memory, where the new data and the target address both correspond to the target stream number, and are sent to the storage controller by the cache. It may be understood that the external memory is a memory located outside the stream processor, and the stream processor is usually implemented by using a chip. It may be further understood that the external memory is a memory that is not on the chip.

In one embodiment of the first aspect, the new data is written to the external memory for long-time storage, to make up for deficiency of using the cache for caching.

In one embodiment of the first aspect, the storage controller is further configured to: send the old data that corresponds to the target stream number to the cache, and send the read valid signal to the FIFO, so that the FIFO writes the current stream information into the calculation unit.

In one embodiment of the first aspect, on one hand, the cache can obtain the old data in the external memory, and on the other hand, latency periods of reading data from the calculation unit and the external memory can be synchronized by sending the read valid signal to the FIFO.

In one embodiment of the first aspect, the foregoing external memory includes an off-chip random addressable memory.

In one embodiment of the first aspect, the off-chip random addressable memory is used as the external memory to obtain advantages of access at any time and a fast speed, thereby further improving a stream processing speed of the stream processor.

In one embodiment of the first aspect, the stream processor further includes a stream analysis module, where the stream analysis module is configured to: analyze network traffic, and send the current stream information obtained after the parsing to the FIFO. In addition, the stream analysis module sends a data read command to the storage controller after the parsing is completed, so that the storage controller reads old data corresponding to a target packet from the external memory.

In one embodiment of the first aspect, the stream processor can analyze the network traffic, so that the stream processor has more comprehensive functions, thereby expanding an application range of the stream processor.

In one embodiment of the first aspect, the stream processor further includes a data upload module, where the data upload module is configured to read, according to a preset rule and by using the storage controller, data stored in the external memory, to provide data support for an enterprise service application.

In one embodiment of the first aspect, the external memory can be fully used to provide data support for both the stream processor and other services.

DESCRIPTION OF EMBODIMENTS

Embodiments of this application provide a stream processor, used to implement full line-rate processing and storage of a random stream, so that a hard real-time operation can be performed on the random stream.

In the specification, claims, and the accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such the process, method, system, product, or device.

Figure 1:
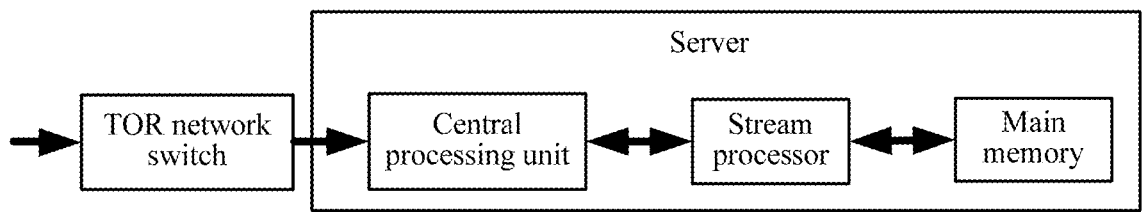
FIG. 1 is a schematic diagram of an application scenario of a stream processor according to an embodiment of this application.

FIG. 1 is a schematic diagram of an application scenario of a stream processor according to an embodiment of this application. The application scenario includes a top of rack (top of rack, TOR) network switch, a central processing unit, a stream processor, and a main memory. The central processing unit, the stream processor, the main memory, and the like constitute a server. The TOR network switch injects network traffic to the central processing unit, and therefore transports the network traffic to the server. The central processing unit analyzes the network traffic, and sends, to the stream processor, a stream packet obtained after the analysis is completed. After processing the stream packet by reading related data in the main memory, the stream processor writes processed information into the main memory for storage, or may send processed information to the central processing unit as required, to provide data support for other applications. In addition, the main memory may be an off-chip random addressable memory, configured to store random stream information that corresponds to a hard real-time operation.

A hardware architecture corresponding to the application scenario may be a server chassis. The chassis includes a server board used as a receive host configured to receive network traffic from the TOR network switch. Next, chips such as the central processing unit, the stream processor, and the main memory are installed on the server board and configured to perform UHB/streaming computation or the like to implement a hardware acceleration function of massive random online streams. The stream processor may be alternatively a chip such as a field-programmable gate array (FPGA) or an application-specific integrated circuit (ASIC), or another chip. Programming is performed on a stream processor chip to complete a read/write request of the central processing unit, and various types of access and control are performed on a storage chip such as the main memory controlled by the stream processor chip. The chips such as the central processing unit, the stream processor, and the main memory may be provided on a printed circuit board (PCB) and are connected to each other by using a cable of the PCB, and eventually a server board is presented.

It should be noted that the foregoing server board may further include a chip having another function such as a memory chip. This is not limited in this application.

Figure 2:
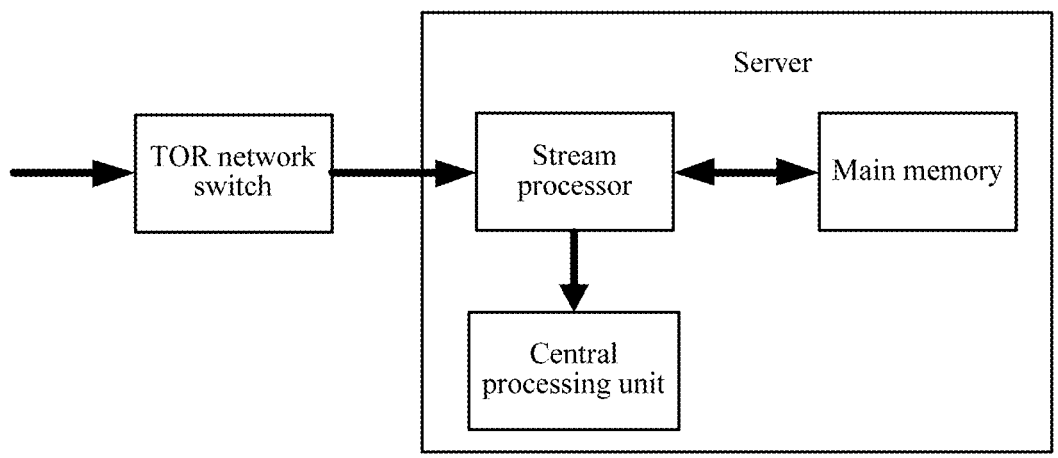
FIG. 2 is a schematic diagram of another application scenario of a stream processor according to an embodiment of this application.

FIG. 2 is a schematic diagram of another application scenario of a stream processor. A difference between the another application scenario and the application scenario shown in FIG. 1 lies in that, the stream processor may complete a function of analyzing network traffic, and a TOR network switch directly injects the network traffic into the stream processor for analysis. Therefore, unidirectional communication is performed between the stream processor and the central processing unit. Other operations are similar to those in the application scenario corresponding to FIG. 1. Details are not described herein again.

Figure 3:
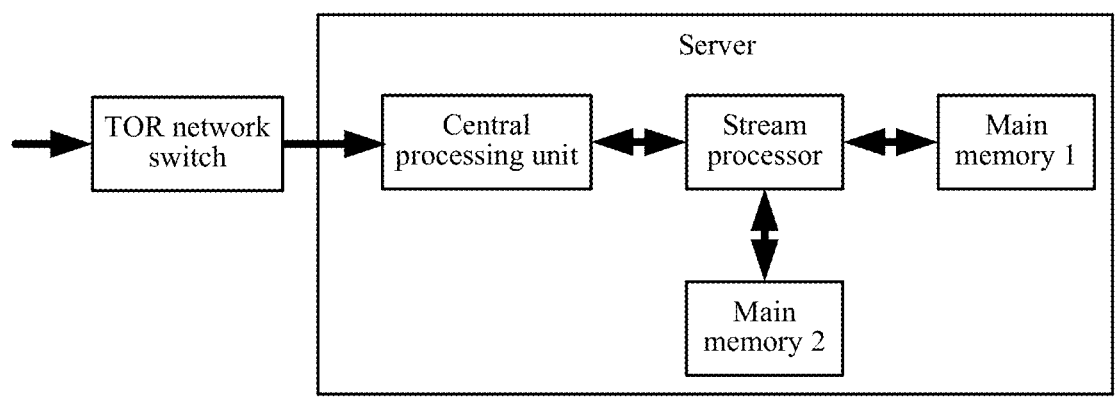
FIG. 3 is a schematic diagram of another application scenario of a stream processor according to an embodiment of this application.

FIG. 3 is a diagram of still another application scenario according to an embodiment of this application. A difference between the still another application scenario and the application scenario shown in FIG. 1 lies in that, two main memories (a main memory 1 and a main memory 2) are included in FIG. 2. One main memory is configured to store random stream information that corresponds to a hard real-time operation (for example, jitter statistics of a stream packet), and the other main memory is configured to store random stream information of a soft real-time operation (for example, receive statistics of a packet stream). Descriptions of other parts are similar to those in the foregoing two application scenarios. Details are not described herein again.

It should be further noted that the stream processor in this embodiment of this application is directed to resolving real-time processing and storage problems of massive random streams based on a read-modify-write mode, and the stream processor can be used for an IP network UHB product, a network performance tester, a streaming hardware acceleration processing platform, and the like, and may be applied to other high-performance processing products, for example, products in fields such as self-driving, 5G communication, and big data streaming hardware acceleration, which provide a basic cache processing technology for various types of hard real-time applications. In addition, when traffic required by a user is further increased, expansion can be performed in combination with a double data rate synchronous dynamic random access memory (DDR SDRAM) to meet smooth evolution of a service. A type of a service is not limited in this application. For example, the service may be a hard real-time operation such as advanced sequencing and a soft real-time operation such as statistics of a received packet stream.

For a more convenient understanding of the stream processor in this embodiment of this application, the stream processor in this embodiment of this application is described below with reference to a structure of the stream processor. It should be noted that, in the following embodiments, that the external memory is an off-chip random addressable memory is used as an example for description. In addition, the packet stream number is an identifier for identifying a different type of stream information or stream information of a different service, and may be a stream ID or another identifier. This is not limited in this application.

Figure 4A:
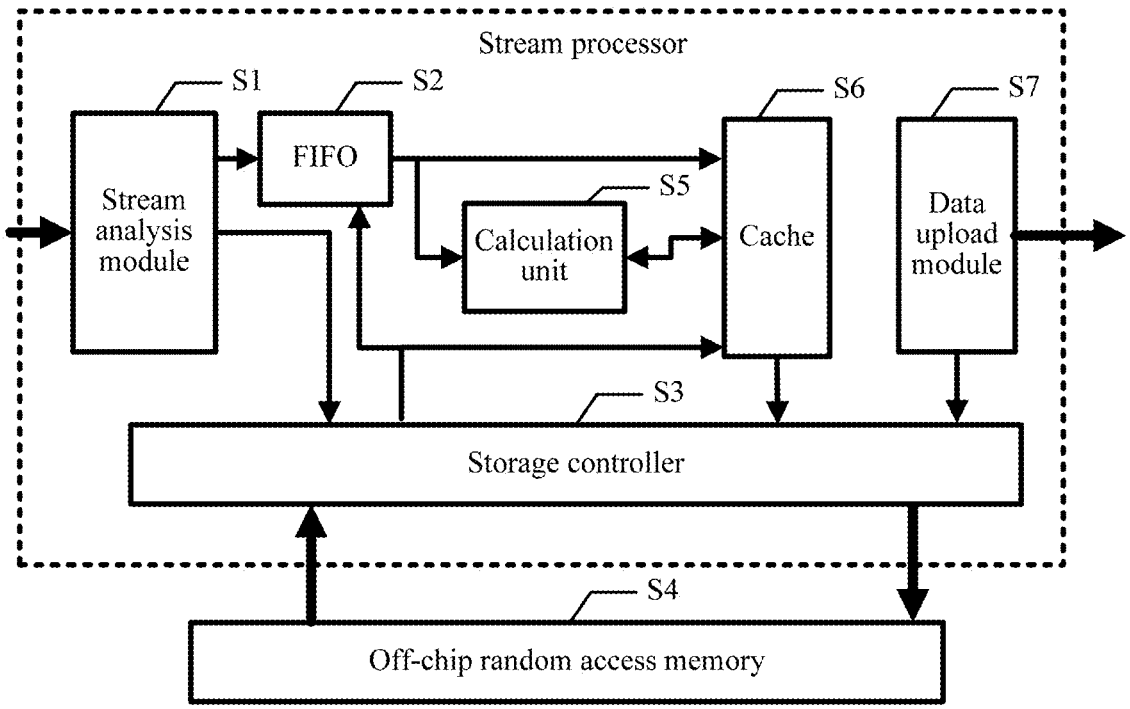
FIG. 4(a) is a schematic structural diagram of a stream processor according to an embodiment of this application.

FIG. 4(a) is a schematic structural diagram of a stream processor. The stream processor includes: a stream analysis module S1, a first in first out (FIFO) memory S2, a storage controller S3, a calculation unit S5, a cache S6, and a data upload module S7. In addition, an off-chip random addressable memory S4 is further included in FIG. 4(a) and is used as a main memory configured to store data.

A working principle and a working process of the stream processor are as follows and include:

Operation 1: In one embodiment, the stream analysis module S1 parses random network traffic, sends current stream information (for example, a current stream packet) obtained after the parsing to the FIFO S2, and initiates, based on a storage address that corresponds to the current stream information obtained after the parsing, a data read command to the storage controller S3, where the data read command is used to instruct the storage controller S3 to read old data stored in the foregoing storage address from the off-chip random addressable memory S4.

It should be noted that, similar to that in the foregoing application scenario, traffic analysis of the random network traffic may be completed by the stream analysis module S1 or may be completed by a chip such as the central processing unit other than the stream processor. This is not limited in this application.

Operation 2: The FIFO S2 receives the current stream information (for example, the current stream packet) sent by the stream analysis module S1, where the current stream information carries a target stream number and target data. The FIFO S2 first stores the current stream information, waits until the storage controller returns a read valid signal, where the read valid signal is used to instruct the FIFO S2 to send the current stream information (including the target stream number and the target data) to the calculation unit S5, and sends the target stream number to the cache S6, where the target stream number is a packet stream number that corresponds to the current stream information.

In one embodiment, when the FIFO S2 receives the current stream information sent by the stream analysis module S1, a parsing module in the FIFO S2 parses the current stream information, namely, the current packet, and obtains the target stream number and the target data.

After the stream analysis module S1 initiates the data read command to the storage controller S3, the storage controller S3 reads the old data at a corresponding storage address in the off-chip random addressable memory S4 according to an instruction of the data read command. Next, after reading the old data, the storage controller S3 sends a read valid signal to the FIFO S2, and at the same time, the storage controller S3 sends the read old data to the cache S6. It may be understood that assuming that the moment at which the stream analysis module S1 initiates the data read command to the storage controller S3 is T1, the moment at which the off-chip random addressable memory S4 sends the read old data to the storage controller S3 is T2, and the moment at which the storage controller S3 sends the read valid signal to the FIFO S2 is T3, a read period of the external random addressable memory S4 is T2T1, and a read period of the stream processor is T3T1.

Based on the foregoing operation, it can be implemented that information in the stream processor and information in the off-chip random addressable memory S4 outside the stream processor are synchronized, thereby resolving a problem that read time latency between the off-chip random addressable memory S4 and the storage controller S3 in the stream processor is excessively high.

Based on that a FIFO depth is equal to RL/Tclk, it may be known that RL/Tclk is very small at this moment. Therefore, the depth of the FIFO S2 in this solution is very small, so that resource consumption per port can be effectively reduced (for example, if a bit width of the FIFO S2 is 512 bits and the depth is 64, a port resource occupied by the FIFO S2 is only 32 Kbits, which is much lower than that in other common solutions). RL is the read period (or read latency) of the stream processor; and Tclk is a clock cycle in which a stream processor chip (for example, an FPGA chip) is run.

Operation 3: After receiving the target stream number and the target data sent by the FIFO S2, the calculation unit S5 reads old data that corresponds to the target stream number from the cache S6, and performs calculation on the old data based on the target data to obtain new data.

In one embodiment, the calculation unit S5 reads old data that corresponds to random stream information from the cache S6, where the cache S6 has a selection function. Therefore, the old data may be cached by the cache S6 or may be sent by the storage controller S3 to the cache S6. A selection manner includes the following operations:

When the same packet stream number is received twice by the cache S6 at a time interval less than or equal to a preset period, the cache S6 selects the old data cached in the cache S6 to the calculation unit S5 and send the old data; or when different packet stream numbers are received or the same packet stream number is received twice by the cache S6 at a time interval greater than the preset period, the cache S6 selects the old data sent by the storage controller S3 to the cache S6 and sends the old data to the calculation unit S5.

It should be understood that the cache S6 caches new data obtained after each calculation by the calculation unit S5 for a preset period, and writes the new data into the storage controller S3, so that the storage controller S3 writes the new data back into the off-chip random addressable memory S4 for storage, and the new data is used as old data when a next random stream with a same packet stream number arrives. Because random streams are processed, a random stream with the same packet stream number may still arrive within the preset period. Therefore, the cache S6 needs to filter old data to ensure that old data that is recently updated is used to perform calculation each time, thereby avoiding incorrect detection.

Figure 4B:
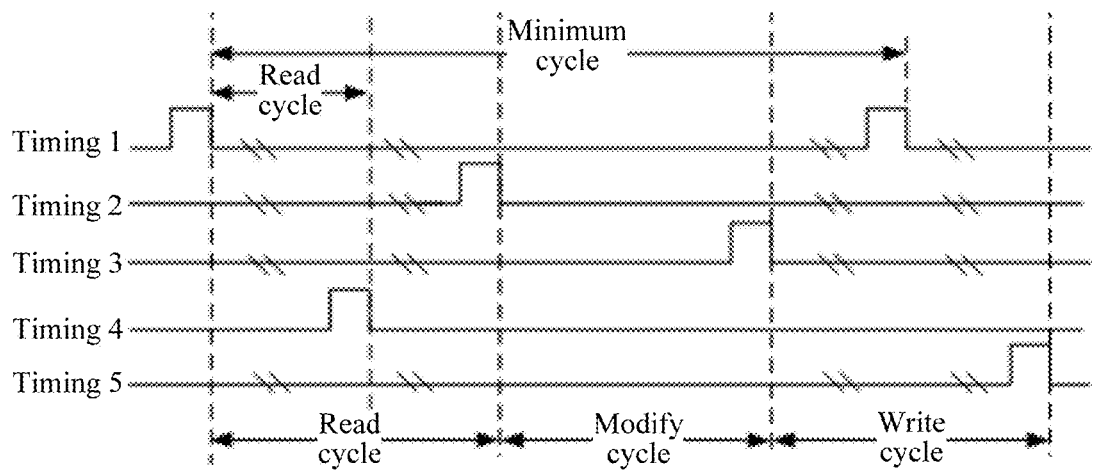
FIG. 4(b) is a schematic timing diagram of a stream processor according to an embodiment of this application.

In addition, FIG. 4(b) is a schematic timing diagram of a stream processor and an external random addressable memory S4. Timing 1, timing 2, and timing 3 are timing used by the stream processor to process a random stream. Timing 4 and timing 5 are the timing of reading data from and writing data into the external random addressable memory S4.

The timing 1 represents corresponding timing in which the stream analysis module S1 sends a data read command to the storage controller S3, and the storage controller S3 starts to read old data stored in the storage controller S3 from the first falling edge in the timing 1. The timing 2 represents timing in which the storage controller S3 initiates a read valid signal to the FIFO S2, where the calculation unit S5 starts to modify the old data at a falling edge in the timing 2. The timing 3 represents timing in which the cache S6 writes new data obtained after the modification into the off-chip random addressable memory S4, and the cache S6 starts to write the new data by using the storage controller S3 at a falling edge in the timing 3 into the off-chip random addressable memory S4.

Furthermore, the timing 4 represents timing in which the off-chip random addressable memory S4 writes the old data into the storage controller S3, and a falling edge in the timing 4 is a moment at which the write operation is started. The timing 5 represents timing in which the storage controller S3 writes the new data into the off-chip random addressable memory S4, and a falling edge in the timing 5 is a start moment.

It may be understood that a period between the first falling edge in the timing 1 and the falling edge in the timing 2 is a cycle of reading the old data that corresponds to a current random stream by the stream processor, and is represented by RL; a period between the falling edge in the timing 2 and the falling edge in the timing 3 is a cycle of modifying the old data that corresponds to the current random stream, and is represented by ML; and a period between the falling edge in the timing 3 and the falling edge in the timing 5 is a new data write cycle when no read/write conflict exists in the off-chip random addressable memory S4, and is represented by WL. In addition, there are two cases in which no read/write conflict exists in the off-chip random addressable memory S4: In one case, the off-chip random addressable memory supports repeated addressing of a same address. In the other case, the off-chip random addressable memory does not support repeated addressing of a same address but a same address is repeatedly addressed. Certainly, other cases in which a read/write conflict may occur is not limited herein.

It should be further noted that a period between the first falling edge in the timing 1 to the falling edge in the timing 4 is a cycle of reading data in the off-chip random addressable memory S4 by the storage controller S3, and is represented by RL'. It should be understood that, on one hand, after the second falling edge in the timing 1, the stream processor starts to process a next random stream. That is, the stream analysis module S1 initiates a data read command again. In other words, a next data read is performed on the off-chip random addressable memory S4. On the other hand, because it takes a period to perform the read, it should be understood that the period between the falling edge in the timing 3 and the second falling edge in the timing 1 is a period of writing data of the cache S6 into the storage controller S3, and a period between the second falling edge in the timing 1 and the falling edge in the timing 5 is a period of writing data of the storage controller S3 into the off-chip random addressable memory S4. In this case, the period is equal to RL'. Therefore, within the period RL' after the second falling edge in the timing 1, a same address may be repeatedly addressed. Consequently, a read and write conflict occurs and there is an imbalance between read and write, resulting in read and write errors.

Therefore, Trd represents a minimum stream processing cycle of the stream processor without a read and write conflict, and Trmw is a read-modify-write cycle of the stream processor. Trmw=RL+ML+WL, and Trd=RL+ML+WL RL'. It is not difficult to learn that Trd=Trmw RL'.

In addition, a time sliding window can be provided to resolve the foregoing read and write conflict. For further descriptions of the read and write conflict and the time sliding window, refer to related description parts in FIG. 8(a), FIG. 8(b), FIG. 9, FIG. 10, and FIG. 11. Details are not described herein again.

Figure 5:
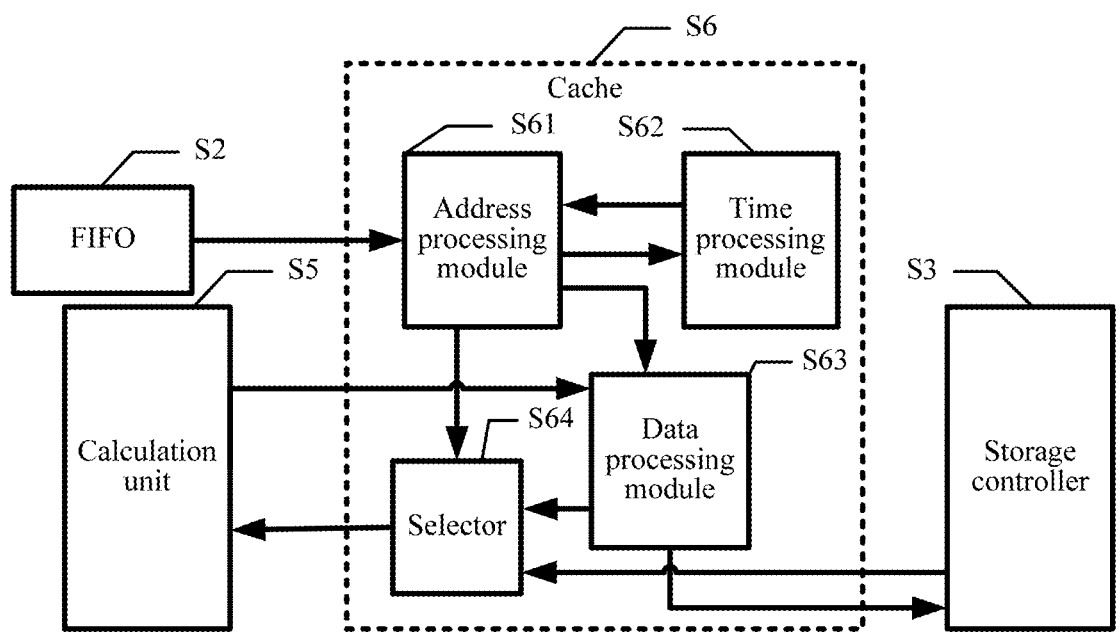
FIG. 5 is a schematic structural diagram of a cache S6 according to an embodiment of this application.

A possible structure of the cache S6 is shown in FIG. 5. The cache S6 includes: an address processing module S61, a time processing module S62, a data processing module S63, and a selector S64. The address processing module S61 includes an address memory and an address storage control unit, and the address storage control unit controls the address memory, and reads address data from the address memory or writes the address data into the address memory. The time processing module S62 includes a time memory and a time management unit, where the time management unit manages a preset period stored in the time memory. The data processing module S63 includes a data memory and a data storage control unit, where a function of the data storage control unit is similar to that of the foregoing address storage control unit, and the data storage control unit controls the data memory and performs data read and write operations on the data memory. In addition, the selector S64 is configured to select, from the data memory or by using the storage controller S3, old data that corresponds to a packet stream number, and write the old data to the calculation unit S5. It may be understood that the old data obtained by using the storage controller S3 is actually from the off-chip random addressable memory S4.

As shown in FIG. 5, a working process of the cache S6 is as follows:

When the address processing module S61 receives the packet stream number sent by the FIFO S2, the address storage control unit determines whether the same packet stream number is stored in the address memory. If the same packet stream number is stored in the address memory, the address storage control unit sends a set signal to the time processing module S62, sends a hit signal to the selector S64, and sends a slot number to the data processing module S63, where the slot number is a label of each of different storage spaces into which the storage unit in the address memory is divided based on the address storage control unit by a size, and the slot number may further identify a data memory space that corresponds to each of different storage addresses in the address memory and that is in the data memory. In addition, when the address processing module S61 receives a slot number identifier sent by the time processing module S62, the address storage control unit controls the storage controller to reset a slot corresponding to the slot number identifier (that is, delete an address that is in the address memory and that corresponds to the slot number identifier).

When the time processing module S62 receives the set set signal sent by the address processing module S61, a value of a counter corresponding to a packet stream number address is set to a maximum value and a count value starts to be decreased. When the counter reaches 0, the data processing module S63 sends, to the selector S64, data information in a data memory space that corresponds to the packet stream number address; and when the counter overflows, the time management unit sends, to the address processing module, a slot number identifier corresponding to the counter that overflows.

After the data processing module S63 receives the slot number sent by the address processing module S61, the data storage control unit controls the data memory to write data information corresponding to the packet stream number to the storage address corresponding to the slot number for storage. In addition, when data information that has been stored in the data memory for a period exceeding the preset period, the data storage control unit controls the data memory to write the data information that has been stored for a period exceeding the preset period (that is, the period during which the foregoing counter decreases to 0 from the maximum value) to the off-chip random addressable memory S4 by using the storage controller S3. The data storage controller may set the preset period through pre-selection and learn of the preset period. This is not limited in this application. In addition, the data storage control unit further controls the data memory to store data information sent by the calculation unit S5 at a storage address.

When the selector S64 receives the hit hit signal sent by the address memory, the selector S64 determines, based on the hit hit signal, a packet stream number that is currently hit. If the foregoing hit hit signal is received twice by the selector S64 at an interval greater than the foregoing preset period or hit hit signals of hitting different packet stream numbers are received by the selector S64 at an interval within the foregoing preset period (less than or equal to the foregoing preset period), the selector S64 selects data information (that is, the old data) of a packet stream number read by using the storage controller S3 from the external random addressable memory S4, and sends the data information to the calculation unit S5. If the selector S64 receives a hit hit signal that hits a same packet stream number within the foregoing preset period (less than or equal to the foregoing preset period), the selector S64 selects data information (that is, the old data) that is of a packet stream number and that is stored by the data memory in the data processing module S63, and sends the data information to the calculation unit S5.

In addition, each time when the calculation unit S5 finishes performing calculation on one piece of stream information, the calculation unit writes data information (that is, new data) obtained after the calculation into the data memory in the data processing module S63 for caching.

First, it should be noted that the old data and the new data are relative terms, and are essentially both data information obtained after the calculation unit S5 performs calculation based on data information in a current stream. Data is new or old depending on each calculation of the calculation unit S5. Data information that is cached in the data memory in the data processing module S63 before the current stream information arrives or that corresponds to each packet stream number stored in the off-chip random addressable memory S4 may be understood as the old data. After the current stream information arrives, data information obtained after the calculation unit S5 performs calculation based on data information carried in the current stream information may be understood as the new data. It should be understood that, when stream information corresponding to the packet stream number arrives for the first time, it may be considered that there is no old data, or initialized data that needs to be set in advance before calculation is used as the old data.

Next, it should be further noted that, because the cache S6 has a caching function, for a same address in the off-chip random addressable memory S4, within an idle period during which the address is not read, the cache S6 may write the data information into the off-chip random addressable memory S4 by using the storage controller S3. It may be understood that, in this way, it can be implemented that data can be accessed in (read from or written into) all storage spaces in the off-chip random addressable memory S4 at the same time. In one embodiment, the off-chip random addressable memory S4 is randomly addressed and accessed by using full bandwidth. In addition, it may be further understood that, because the cache S6 has a caching function, for a same address in the off-chip random addressable memory S4, a read operation and a write operation do not occur at the same time, so that a read and write conflict is avoided, and balance between read and write is maintained, thereby resolving a problem of a read and write (RAW) race hazard.

Subsequently, the address processing module S61, the time processing module S62, and the data processing module S63 may be implemented by using a random access memory (RAM) or may be implemented by using a register such as a content addressable register (CAM).

Figure 6:
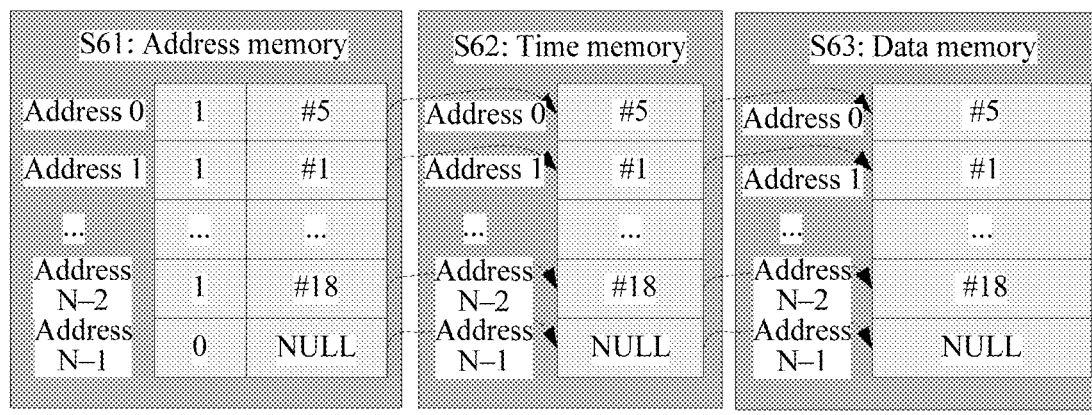
FIG. 6 is a diagram of a mapping relationship among an address processing module S61, a time processing module S62, and a data processing module S63 according to an embodiment of this application.
Figure 7:
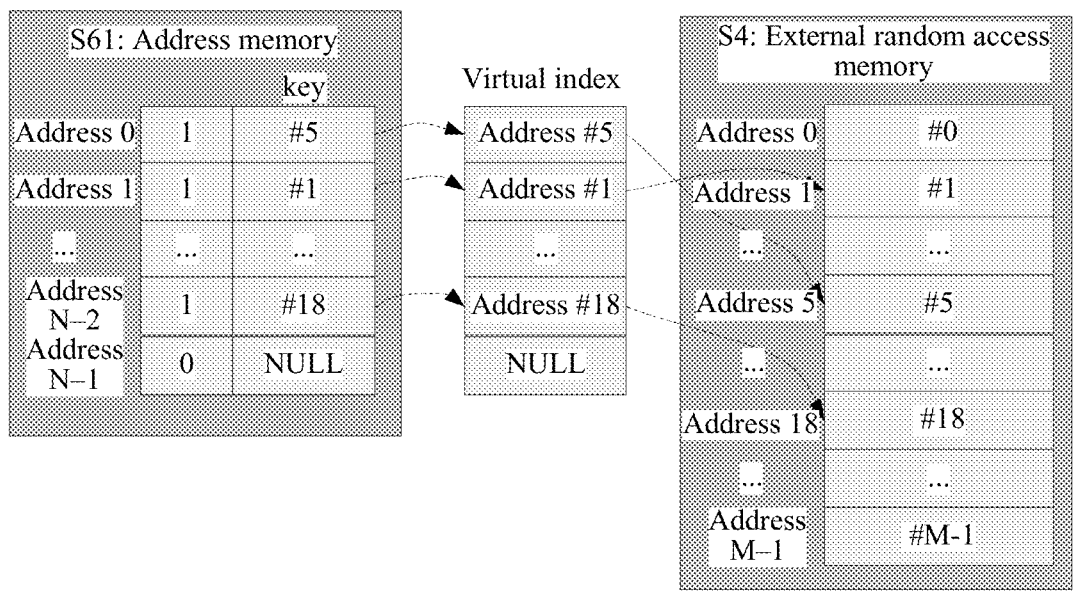
FIG. 7 is a diagram of a mapping relationship between an address processing module S61 and an external random addressable memory S4 according to an embodiment of this application.

In one embodiment, Addr CAM represents the address processing module S61, Timer Mem represents the time processing module S62, and Data Mem represents the data processing module S63. Depths of memories (the address memory, the time memory, and the data memory) in the three processing modules in the cache S6 are the same, and the depth is denoted as N. In this case, a mapping relationship between the foregoing three registers is shown in FIG. 6, and a mapping relationship between the address memory in the address processing module S61 (that is, Addr CAM) and the external random addressable memory S4 is shown in FIG. 7. In the figure, the off-chip random addressable memory S4 is represented by a local memory.

As shown in FIG. 6, addresses that correspond to packet stream numbers entering the cache S6 within a preset period and that are at addresses in the off-chip random addressable memory S4 are stored in the Addr CAM S61. It is equivalent to a cache registration mechanism. The packet stream numbers are stored in the Addr CAM S61, and are sequentially mapped to corresponding offset addresses in the off-chip random addressable memory S4 based on values of the stream numbers, while an address of the Addr CAM S61 corresponds to an address of another memory in the cache.

Timer Mem S62 stores a life cycle, namely, the preset period, of a stream entry that corresponds to each packet stream number in the cache S6. A life cycle of each slot (that is, a storage unit in the address memory) in the Timer Mem S62 is implemented by using a countdown counter. Each time when a stream entry occupies a slot in the Timer Mem S62, a counter of the slot is reset once to a set maximum value, and when the count value is decreased to a set minimum value, the stream entry of the slot is cleared.

Data Mem S63 stores data information content of each stream entry in the cache S6, which is a mirror image of content in the off-chip random addressable memory S4, where content stored in an unoccupied slot is null.

It may be understood that, the cache S6 uses a cache eviction algorithm: a sliding time-based expiration (STBE). The mechanism provides a life clock for each slot in the cache. When the slot is hit or updated or the life clock overflows, the life cycle of the slot is reset. Therefore, the life clock is equivalent to a time sliding window based on a packet hit status. In the time sliding window, if packets with a same stream number request to perform read-modify-write operations on the off-chip random addressable memory S4, only the first packet in the random stream performs the read operation on the off-chip random addressable memory S4, while subsequent packets sequentially read a cache result that is generated a previous time by using the random stream. Results of the packets are sequentially written into the off-chip random addressable memory S4.

Figure 8A:
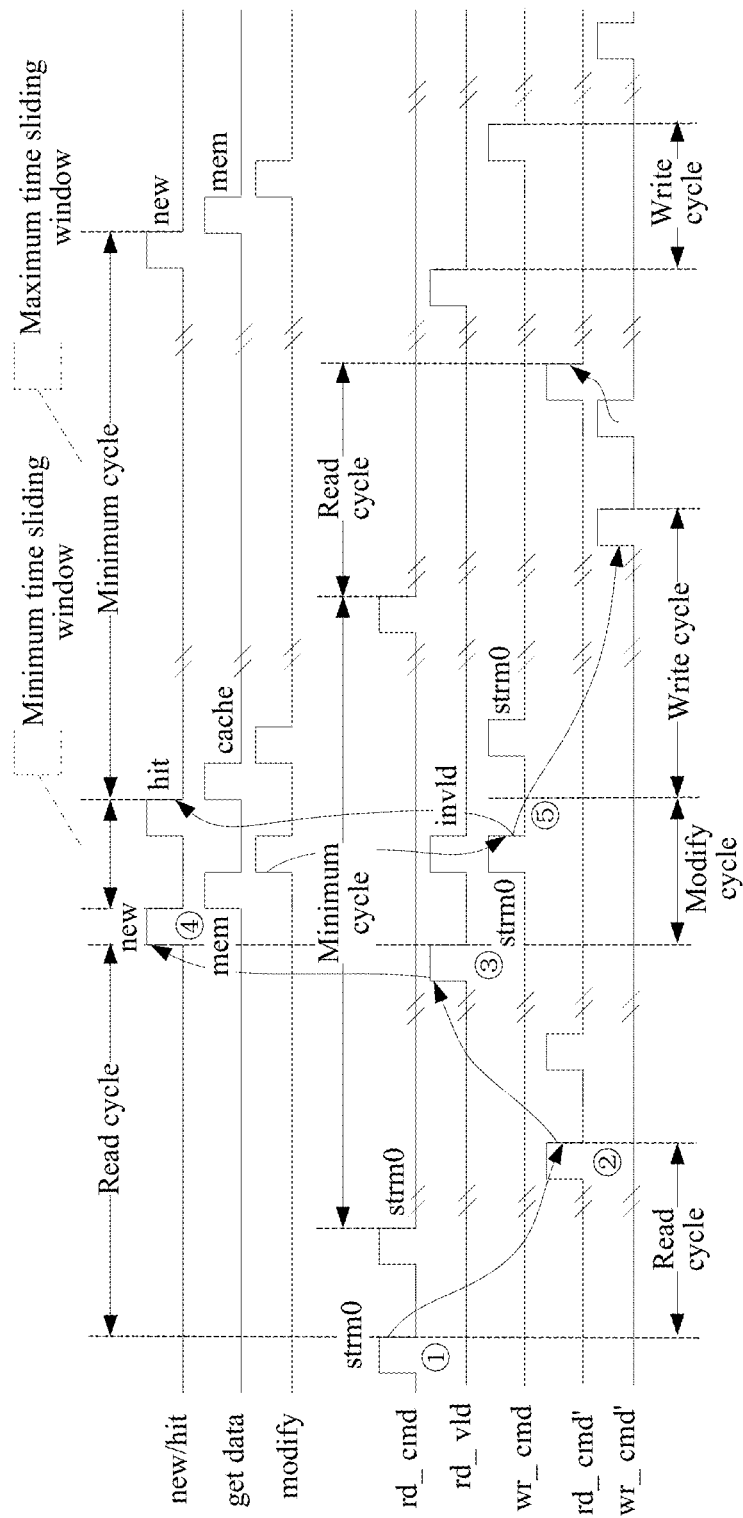
FIG. 8(a) is a schematic timing diagram of a time sliding window mechanism according to an embodiment of this application.

FIG. 8(a) is a timing diagram of a time sliding window mechanism of the cache S6. Three signals, namely, a new/hit signal, a get data signal, and a modification signal, indicate timing used by the calculation unit S5 to modify old data to obtain new data, where slide window min is a minimum period that corresponds to the time sliding window, and slide window max is a maximum period that corresponds to the time sliding window. An rd_cmd signal, an rd_vld signal, a wr_cmd signal, an rd_cmd' signal, and a wr_cmd' signal are respectively similar to the timing 1, the timing 2, the timing 3, the timing 4, and the timing 5 in the foregoing FIG. 4(b). For related descriptions thereof, refer to the related descriptions corresponding to FIG. 4(b). Details are not described herein again. In addition, in FIG. 8(a), mem and cache respectively correspond to the off-chip random addressable memory S4 and the cache S6 in FIG. 4(a), strm0 indicates a random stream of a task, which is similar to a task described below, and invld indicates a corresponding moment at which an rd_vld signal is input to the FIFO S2. Finally, for other related descriptions of FIG. 8(a), further refer to the related descriptions of the foregoing FIG. 4(a) and FIG. 5. Details are not described herein again.

It should be noted that, after the time sliding window mechanism is used, in the system, the problem of the RAW race hazard in the off-chip random addressable memory S4 within a time period of (MLTclk) to Trd can be resolved. In one embodiment, a detection range of the time sliding window is (MLTclk) to Trd.

In an extreme case, a packet arrives in each clock cycle. However, time latency of an end to end operation of the memory controller S3 may be extremely large relative to the clock cycle. Consequently, if no special processing is performed, a result that is read by a next packet with a same stream number and that is from the off-chip random addressable memory S4 is not the result that is updated the last time. As a result, a RAW race hazard occurs. However, after the time sliding window mechanism is introduced, it can be ensured that a packet with a same stream number arrives within a period Trd after a current packet arrives can be correctly calculated and be written back into the off-chip random addressable memory S4 without reading data from the off-chip random addressable memory S4.

In the example in FIG. 8(a), when the cache S6 is still empty, two streams that have a same addressing address arrive at a time interval of a time MLTclk, the first stream does not hit the cache S6, and therefore occupies a slot of the cache, and read old data is data in the off-chip random addressable memory S4; however, when the second stream arrives, the first stream is located in a time window before the time window in which the second stream is located by (MLTclk) to Trd, and therefore is hit, and read old data is data generated by using the first stream and cached into the cache S6.

For the calculation unit S5, in a possible calculation manner, the calculation unit S5 performs, according to a pipeline bypassing mechanism, calculation on old data that corresponds to a target stream number to obtain new data.

Figure 8B:
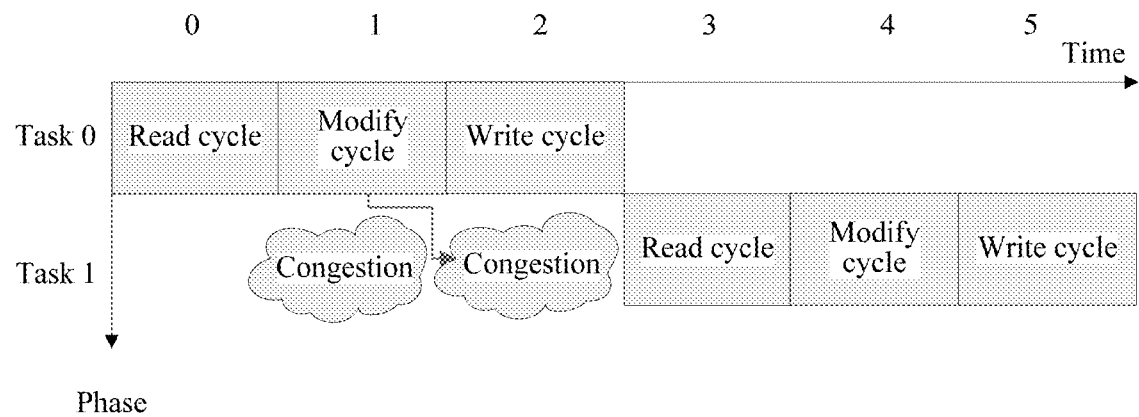
FIG. 8(b) is a pipeline space-time diagram of a RAW data race hazard when a pipeline bypassing mechanism is not used.
Figure 9:
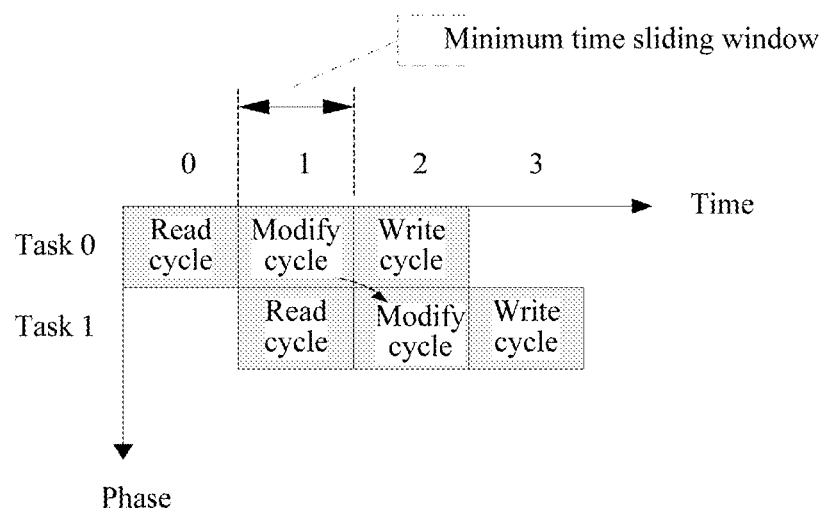
FIG. 9 is a pipeline space-time diagram when a pipeline bypassing mechanism is used.
Figure 10:
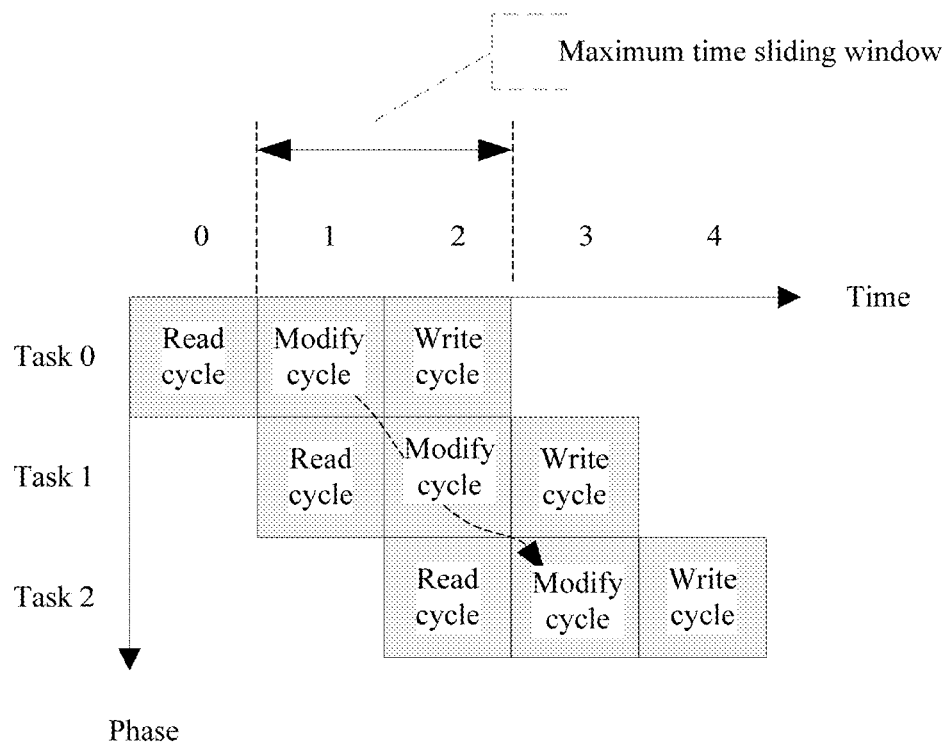
FIG. 10 is another pipeline space-time diagram when a pipeline bypassing mechanism is used.
Figure 11:
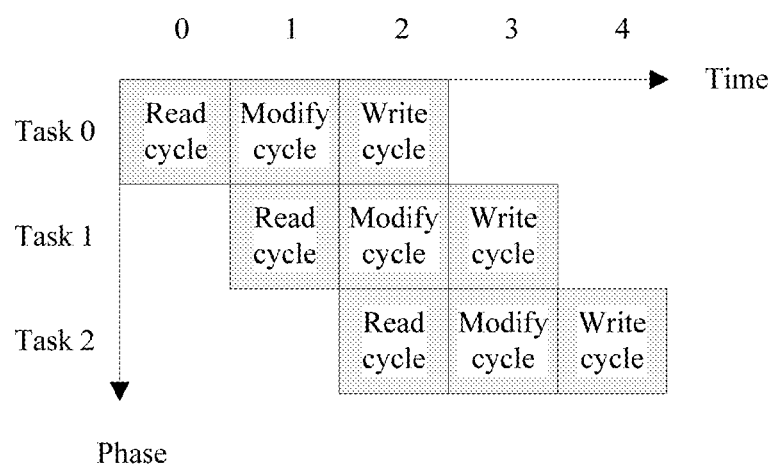
FIG. 11 is still another pipeline space-time diagram when a pipeline bypassing mechanism is used.

FIG. 8(b) is a pipeline space-time diagram during a RAW data race hazard when a pipeline bypassing mechanism is not used. FIG. 9, FIG. 10, and FIG. 11 are pipeline space-time diagrams when a pipeline bypassing mechanism is used.

As shown in FIG. 8(b), when the pipeline bypassing mechanism is not used, a task 0 is a task being processed within a current cycle, and a task 1 is a recently arrived task in a next cycle. When the task 1 arrives within any one (a read cycle RD0, a modify cycle MF0, and a write cycle WR0) of read-modify-write cycles of the task 0, the calculation unit S5 cannot simultaneously process the task 0 and the task 1. Consequently, congestion occurs. As shown in FIG. 8(b), when the task 1 arrives within the cycle MF0 of the task 0, congestion occurs in two cycles (MF0 and WR0).

FIG. 9 shows a working status after a pipeline bypassing mechanism is used. FIG. 9 shows a RAW data hazard between neighboring tasks. When a task 1 arrives, a task 0 is located in a minimum time sliding window before a time sliding window in which the task 1 is located by one cycle, and an operation input stage of the task 1 directly obtains data from an operation output stage of the task 0. It may be further understood that in the minimum time window (for example, the preset period), two neighboring random streams with a same packet stream number successively enter the calculation unit S5. In this case, new data that is of the random stream that arrives first and that is cached in the cache S6 is directly used as old data of the random stream that arrives next to perform calculation again. This is similar to a selection function of the selector S64. Details are not described herein again.

FIG. 10 shows another working status after a pipeline bypassing mechanism is used. FIG. 10 shows a RAW data race hazard between tasks that are spaced. When a task 1 arrives, the off-chip random addressable memory S4 is not repeatedly addressed in a time sliding window of the task 1. However, when a task 2 arrives, the task 0 is located in a maximum time sliding window before a time sliding window of the task 2 by two cycles. In this case, an operation input stage of the task 2 directly obtains data from an operation output stage of the task 0. For another understanding, refer to corresponding descriptions in FIG. 9. Details are not described herein again.

FIG. 11 shows still another working status after a pipeline bypassing mechanism is used. FIG. 11 shows that there is no RAW data hazard between tasks in the time sliding window. When the task 1 and the task 2 successively arrive, the off-chip random addressable memory S4 is not repeatedly addressed in a time sliding window before a time sliding window in which each task is located. Therefore, data is obtained from the external random addressable memory for both the tasks.

In one embodiment, when the pipeline bypassing mechanism is used, difficulty of implementing the pipeline bypassing mechanism may be further reduced with reference to a multi-copy operation technology. Certainly, the method is not the only method to reduce implementation difficulty. Other solutions that can achieve a similar technical effect are not limited in this application.

It may be understood that, a period from the time of receiving the read valid signal by the FIFO S2 to the time of calculating the old data by the calculation unit S5 to obtain new data is a period within which the old data is modified. In this process, the old data is modified.

Operation 4: The calculation unit S5 writes the new data obtained after the calculation into the cache S6 for caching, and then the cache S6 writes the new data into the storage controller S3, so that the storage controller S3 writes the new data back into the off-chip random addressable memory S4 for storage, and the new data is used as old data when a next random stream with the same packet stream number arrives.

In one embodiment, the calculation unit S5 writes the new data obtained after the calculation into the data memory S63 into the cache S6. The cache S6 determines a target address (an address in the off-chip random addressable memory) based on a mapping relationship shown in FIG. 7, and writes the new data and the target address into the storage controller S3. Finally, the storage controller S3 writes the new data into the target address in the off-chip random addressable memory for storage.

It may be understood that, operation 4 is a write process of the new data, and therefore a write function for the new data is implemented.

Operation 5: In one embodiment, the data upload module S7 reads, according to a preset rule and by using the storage controller, data stored in the off-chip random addressable memory S4, to provide data support for other applications.

It should be further noted that, in this embodiment of this application, calculation of the old data by the calculation unit S5 may be a calculation operation for a hard real-time service, or may be a calculation operation for a soft real-time service. This is not limited in this embodiment of this application.

Finally, it should be noted that the modules in the stream processor according to this application may be circuits that implement functions of the modules based on the ASIC and/or the FPGA. This is not limited in this application.

In this embodiment of this application, the stream processor includes the FIFO and the cache. On one hand, the FIFO has a first in first out feature, and can store a particular amount of stream information, so that when the stream processor obtains the old data that corresponds to the target stream number, other stream information can still enter the FIFO for storage, and each piece of stream information does not need to wait in a queue, thereby shortening the stream processing cycle. On the other hand, the cache can cache the old data and therefore can directly provide old data support for the calculation unit in a particular case, to accelerate stream processing; in addition, the cache can cache the new data and therefore may not necessarily write the new data into an external memory in a stream processing process, and it may be understood that a caching speed is much higher than a data write speed of the external memory, so that the stream processing cycle of the stream processor is shortened to some extent. Based on the foregoing two aspects, for the stream processor in this application, the stream processing cycle of the stream processor may be approximately reduced from a data read-modify-write latency period to a data modify latency period (that is, a period required by the calculation unit to obtain the new data by performing calculation on the old data). Therefore, in this application, the stream processing cycle of the stream processor can be effectively shortened, and a stream processing speed can be improved, to improve a capability of the stream processor to process a hard real-time service, so that the stream processor can process a service having a higher real-time requirement.

Further, the foregoing operations are used, so that a random stream at a line rate can have a hit rate of 100%, no miss occurs in data processing, and a hard real-time processing and storage capability in fields such as 100 GE/400 GE ultra-wideband IP and streaming computation hardware acceleration are significantly improved.

It may be clearly understood by persons skilled in the art that, for the purpose of convenient and brief description, for a detailed working process of the foregoing system, apparatus, and unit, refer to a corresponding process in the foregoing method embodiments, and Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random accessing memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A stream processor comprising:
a first in first out memory (FIFO), a calculation circuit, and a cache, wherein
the FIFO receives current stream information, the current stream information carrying a target stream number and target data;

when the FIFO receives a read valid signal, the FIFO sends the target stream number and the target data to the calculation circuit, and sends the target stream number to the cache;

the cache obtains, based on the target stream number, old data that corresponds to the target stream number, and sends the old data that corresponds to the target stream number to the calculation circuit, wherein, the cache further comprises an address processing circuit, and the address processing circuit is configured to: store a packet stream number received by the cache for a preset period, and delete a packet stream number that has been stored for a period exceeding the preset period, and the packet stream number comprises the target stream number; and the calculation circuit performs, based on the target data, calculation on the old data that corresponds to the target stream number to obtain new data, and sends the new data to the cache.

2. The stream processor according to claim 1, wherein the packet stream number corresponds to an address in an external memory.

3. The stream processor according to claim 1, wherein, the cache further comprises a time processing circuit, and the time processing circuit is configured to manage the preset period.

4. The stream processor according to claim 1, wherein, the cache further comprises a data processing circuit, and the data processing circuit is configured to store and manage old data that corresponds to the packet stream number, wherein the old data that corresponds to the packet stream number is data obtained after the calculation circuit performs calculation on a previous piece of stream information with the same packet stream number.

5. The stream processor according to claim 1, wherein, the cache further comprises a selector, and the selector is configured to: select the old data that corresponds to the packet stream number from the cache or a storage controller, and send the old data to the calculation circuit.

6. The stream processor according to claim 1, wherein, the cache is further configured to:

when the same packet stream number is received twice by the cache at a time interval less than or equal to the preset period, send the old data cached in the cache to the calculation circuit; or when different packet stream numbers are received or the same packet stream number is received twice by the cache at a time interval greater than the preset period, send, to the calculation circuit, the old data sent by a storage controller to the cache.

7. The stream processor according to claim 1, wherein, the calculation circuit is configured to:

perform, according to a pipeline bypassing mechanism and by using the target data, calculation on the old data that corresponds to the target stream number to obtain the new data.

8. The stream processor according to claim 1, wherein, the FIFO further comprises a parsing circuit, wherein the parsing circuit is configured to: when the FIFO receives the current stream information, parse the current stream information to obtain the target stream number and the target data.

9. The stream processor according to claim 1, wherein, the stream processor further comprises a storage controller, wherein the storage controller is configured to write the new data to a target address in an external memory, wherein the new data and the target address are sent to the storage controller by the cache, and the external memory is a memory located outside the stream processor.

10. The stream processor according to claim 9, wherein, the storage controller is further configured to:

send the old data that corresponds to the target stream number to the cache, and send a read valid signal to the FIFO.

11. The stream processor according to claim 9, wherein, the external memory comprises an off-chip random addressable memory.

12. The stream processor according to claim 1, wherein, the stream processor further comprises a stream analysis circuit, wherein the stream analysis circuit is configured to: parse network traffic, send the current stream information obtained after the parsing to the FIFO, and send a data read command to a storage controller.

13. The stream processor according to claim 1, wherein, the stream processor further comprises a data upload circuit, wherein the data upload circuit is configured to read, according to a preset rule and by using a storage controller, data stored in an external memory, to provide data support for other applications.

14. A server comprising:

a central processor;

a main memory; and a stream processor coupled to the central processor and the main memory, the stream processor comprising:

a first in first out memory (FIFO), a calculation circuit, and a cache, wherein the FIFO receives current stream information, the current stream information carrying a target stream number and target data;

when the FIFO receives a read valid signal, the FIFO sends the target stream number and the target data to the calculation circuit, and sends the target stream number to the cache;

the cache obtains, based on the target stream number, old data that corresponds to the target stream number, and sends the old data that corresponds to the target stream number to the calculation circuit, wherein, the cache further comprises an address processing circuit, and the address processing circuit is configured to: store a packet stream number received by the cache for a preset period, and delete a packet stream number that has been stored for a period exceeding the preset period, and the packet stream number comprises the target stream number; and the calculation circuit performs, based on the target data, calculation on the old data that corresponds to the target stream number to obtain new data, and sends the new data to the cache.

15. The server according to claim 14, wherein the packet stream number corresponds to an address in an external memory.

16. The server according to claim 14, wherein, the cache further comprises a time processing circuit, and the time processing circuit is configured to manage the preset period.

17. The server according to claim 14, wherein, the cache further comprises a data processing circuit, and the data processing circuit is configured to store and manage old data that corresponds to the packet stream number, wherein the old data that corresponds to the packet stream number is data obtained after the calculation circuit performs calculation on a previous piece of stream information with the same packet stream number.

18. The server according to claim 14, wherein, the cache further comprises a selector, and the selector is configured to: select the old data that corresponds to the packet stream number from the cache or a storage controller, and send the old data to the calculation circuit.

19. The server according to claim 14, wherein, the cache is further configured to:
  when the same packet stream number is received twice by the cache at a time interval less than or equal to the preset period, send the old data cached in the cache to the calculation circuit; or
  when different packet stream numbers are received or the same packet stream number is received twice by the cache at a time interval greater than the preset period, send, to the calculation circuit, the old data sent by a storage controller to the cache.

20. The server according to claim 14, wherein, the calculation circuit is configured to:
  perform, according to a pipeline bypassing mechanism and by using the target data, calculation on the old data that corresponds to the target stream number to obtain the new data.

* * * * *